(12) United States Patent
Uhlendorf et al.

(10) Patent No.: US 8,502,700 B2
(45) Date of Patent: Aug. 6, 2013

(54) APPARATUS AND METHOD FOR PRESSURISING AN AIRCRAFT CABIN STRUCTURE AND MEASURING THE AMOUNT OF LEAKAGE OF THE AIRCRAFT CABIN STRUCTURE

(75) Inventors: Thomas Uhlendorf, Bunsoh (DE); Michael Bielenberg, Hamburg (DE); Matthias Geske, Hamburg (DE); Jens Beier, Drestedt (DE); Juergen Hintze, Hamburg (DE); Michael Diesing-Jester, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 254 days.

(21) Appl. No.: 12/745,513

(22) PCT Filed: Nov. 29, 2007

(86) PCT No.: PCT/EP2007/010371
§ 371 (c)(1),
(2), (4) Date: Jun. 13, 2011

(87) PCT Pub. No.: WO2009/068057
PCT Pub. Date: Jun. 4, 2009

(65) Prior Publication Data
US 2011/0234426 A1 Sep. 29, 2011

(51) Int. Cl.
*G08B 21/00* (2006.01)

(52) U.S. Cl.
USPC .............................. 340/945; 340/971; 340/963

(58) Field of Classification Search
USPC ......................................... 340/945, 971, 963
See application file for complete search history.

(56) References Cited

U.S. PATENT DOCUMENTS 3,918,291 A  11/1975  Pauly et al.
4,553,474 A *  11/1985  Wong et al. ..................... 454/74
(Continued)

FOREIGN PATENT DOCUMENTS

EP  0 385 046  5/1990
JP  H08-015079  1/1996
(Continued)

OTHER PUBLICATIONS

English language translation of Decision on Granting a Patent for Invention from the Russian Federal Service for Intellectual Property, Patents and Trademarks, Application No. 2010121756/11 (030951), Oct. 19, 2011.

(Continued)

*Primary Examiner* — Travis Hunnings
(74) *Attorney, Agent, or Firm* — Krieg DeVault LLP

(57) ABSTRACT

An apparatus for pressurizing an aircraft cabin structure and measuring the amount of leakage of the aircraft cabin structure comprises an air supply line which at a first end is connectable to a pressurized air source and which at a second end is connectable to the aircraft cabin structure so as to supply pressurized air from the pressurized air source into the aircraft cabin structure, an air supply valve disposed in the air supply line, a pressure sensor for sensing the pressure inside the aircraft cabin structure and for providing signals indicative of the pressure inside the aircraft cabin structure, an air discharge line which at a first end is connectable to the aircraft cabin structure and which at a second end is connectable to an air discharge opening so as to discharge air from the inside of the cabin structure to the air discharge opening and an air discharge valve disposed in the air discharge line. An electronic control unit is adapted to control the air supply valve and the discharge valve in dependence on signals provided by the pressure sensor.

19 Claims, 2 Drawing Sheets

U.S. PATENT DOCUMENTS

Figure 1:
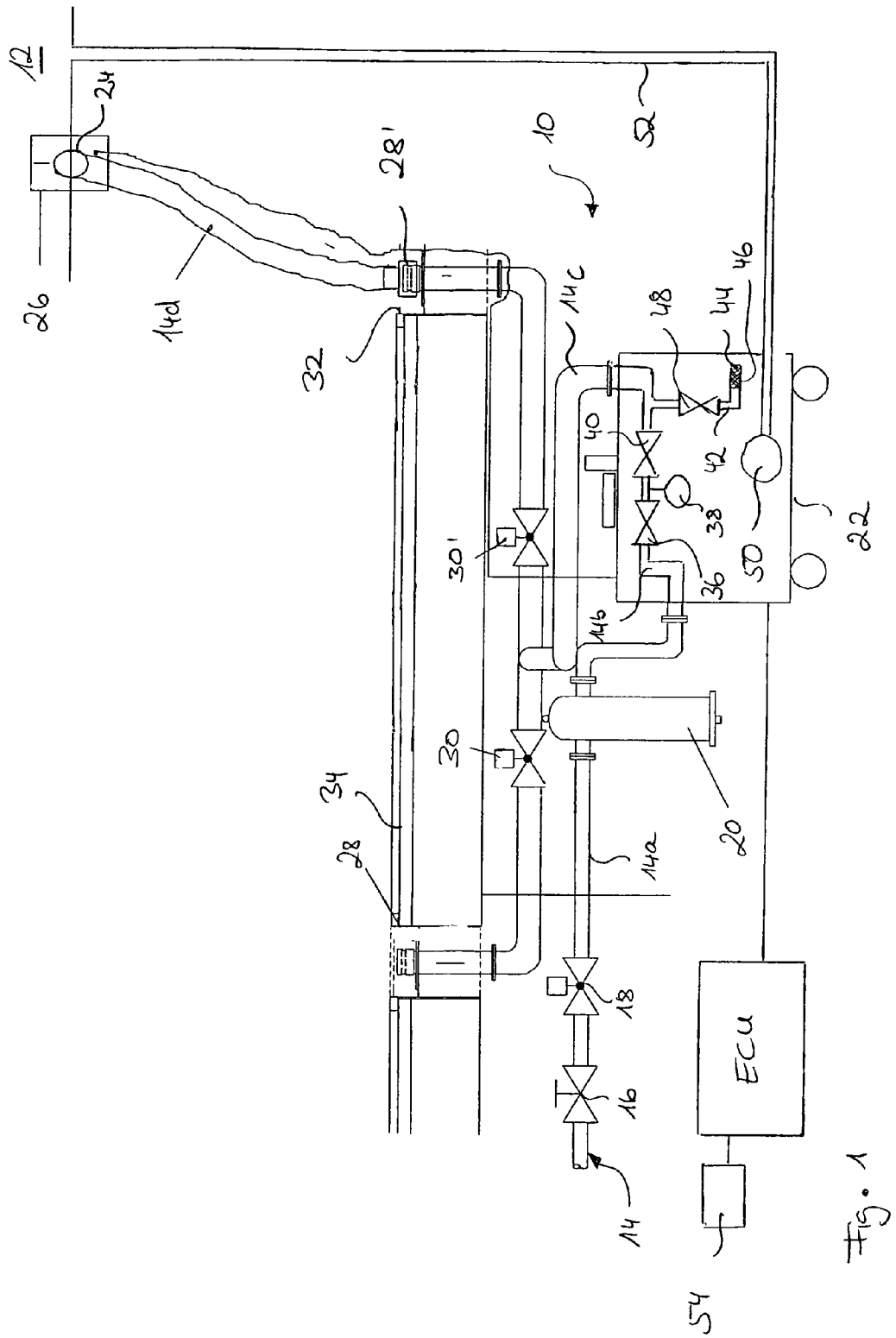

| | | | |
|---|---|---|---|
| H34 H | 3/1986 | Werling | |
| H0000034 H * | 3/1986 | Werling | 73/40.5 R |
| 5,412,978 A | 5/1995 | Boone et al. | |
| 6,532,800 B1 | 3/2003 | Boeckstiegel et al. | |
| 6,955,184 B2 * | 10/2005 | Friedrichs et al. | 137/487.5 |

FOREIGN PATENT DOCUMENTS

| | | |
|---|---|---|
| JP | H09-236528 | 9/1997 |
| SU | 1096879 A1 | 4/1986 |

OTHER PUBLICATIONS

English language abstract for JP H09-236528, Sep. 9, 1997.
English language abstract for JP H08-015079, Jan. 19, 1996.
English language translation of Notice of Reasons for Rejection, Japan Patent Office, for Application No. 2010-53522, May 22, 2012.
International Search Report and Written Opinion, Jul. 31, 2008, PCT/EP2007/010371, Airbus Operations GmbH.

* cited by examiner

APPARATUS AND METHOD FOR PRESSURISING AN AIRCRAFT CABIN STRUCTURE AND MEASURING THE AMOUNT OF LEAKAGE OF THE AIRCRAFT CABIN STRUCTURE

CROSS REFERENCE TO RELATED APPLICATIONS

The present application is a 371 national stage patent application of PCT/EP2007/010371, filed Nov. 29, 2007, which is incorporated herein by reference.

The invention is directed to an apparatus and a method for pressurising an aircraft cabin structure and measuring the amount of leakage of the aircraft cabin structure.

Due to the low environmental pressure in flight altitude of an aircraft, the cabin of the aircraft during flight usually is held under an elevated pressure which corresponds to the atmospheric pressure at an altitude above sea level of approximately 2500 m. The cabin structure thus must be designed so as to withstand the pressure difference between the low environmental pressure and the elevated cabin pressure. Furthermore, the aircraft cabin structure has to be substantially free of leakages so as to be able to maintain the elevated pressure inside the cabin. Therefore, during final assembly of the aircraft, a test has to be performed on the aircraft cabin structure to 1. verify the structural strength of the pressurised cabin and 2. verify the absence of leakages due to defects in assembling which could impede the pressurization of the aircraft cabin during flight.

The present invention is directed to the problem to provide an apparatus and a method for different aircraft types which allow to reliably, precisely and automatically pressurise an aircraft cabin structure so as to provide a value for the cabin leakage.

To solve the above problem, the inventive apparatus comprises an air supply line which at a first end is connectable to a pressurized air source and which at a second end is connectable to the aircraft cabin structure so as to supply pressurized air from the pressurized air source to the aircraft cabin structure. The second end of the air supply line might be connectable to an opening provided in the aircraft cabin structure. For example, the opening for attaching the air supply line might be formed in a dummy aircraft cabin door replacing the original aircraft cabin door during performing the leakage test.

An air supply valve which might for example be an electromagnetic valve is disposed in an air supply line. In its closed state the air supply valve interrupts the fluid connection between the pressurized air source and the aircraft cabin structure, whereas the air supply valve in its open state allows pressurized air to be supplied from the pressurized air source to the aircraft cabin structure.

The inventive apparatus further comprises a pressure sensor for sensing the pressure inside the aircraft cabin structure and for providing signals indicative of the pressure inside the aircraft cabin structure. The pressure sensor might be disposed directly inside the aircraft cabin structure and provide the respective pressure signals via respective electrical connections. Preferably, the pressure sensor, however, is disposed outside the aircraft cabin structure and connected to the inside of the cabin structure for example by means of flexible tubing. Such an arrangement is more robust than an arrangement comprising a complex electric wiring.

Furthermore, an air discharge line is present which at a first end is connectable to the aircraft cabin structure and which at a second end is connectable to an air discharge opening so as to discharge air from the inside of the cabin structure to the air discharge opening. Preferably, the air discharge line branches off the air supply line so that only one connection to the inside of the aircraft cabin structure is required. The air discharge opening might open to the environment and might be provided with a sound absorber so as to dampen noise generated upon discharging air from the aircraft cabin structure via the air discharge line and the air discharge opening.

An air discharge valve which, like the air supply valve, might be an electromagnetic valve is disposed in the air discharge line. In its closed state the air discharge valve interrupts the fluid connection between the aircraft cabin structure and the air discharge opening, whereas the air discharge valve in its open state allows air to be discharged from the aircraft cabin structure to the air discharge opening.

An electronic control unit of the inventive apparatus for detecting leakages in an aircraft cabin structure is adapted to control the air supply valve and the air discharge valve in dependence on signals provided by the pressure sensor so as to supply pressurized air into the aircraft cabin structure until a first predetermined pressure level is reached inside the aircraft cabin structure, to maintain the pressure inside the aircraft cabin structure at the first predetermined level for a first predetermined period of time, and thereafter to discharge air from the inside of the aircraft cabin structure. In other words, the electronic control unit controls the air supply valve and the air discharge valve so as to supply pressurized air into the aircraft cabin structure and hence to build up an elevated pressure inside the aircraft cabin structure. Due to the pressure difference between the inside of the aircraft cabin structure air leaks from the inside of the aircraft cabin structure. During the first predetermined period of time an operator thus can easily inspect the aircraft cabin structure and hence reliably recognize detrimental leakages in the aircraft cabin structure which result from defects of individual components or defects in assembling.

In a preferred embodiment of the inventive apparatus the electronic control unit further is adapted to control the air supply valve and the air discharge valve in dependence on signals provided by the pressure sensor so as to further supply pressurized air into the aircraft cabin structure after the first predetermined period of time and prior to discharging air from the inside of the aircraft cabin structure until a second predetermined pressure level is reached inside the aircraft cabin structure. The second predetermined pressure level is a higher pressure level than the first predetermined pressure level. The electronic control unit might further be adapted to control the air supply valve and the air discharge valve in dependence on signals provided by the pressure sensor so as to maintain the pressure inside the aircraft cabin structure at the second predetermined level for a second predetermined period of time. The second predetermined period of time then can again be used for inspecting the aircraft cabin structure and thus to recognize for example smaller leakages which were not recognized during the first predetermined period of time.

Furthermore, the electronic control unit of the inventive apparatus might be adapted to control the air supply valve and the air discharge valve in dependence on signals provided by the pressure sensor so as to further supply pressurized air into the aircraft cabin structure after the second period of time until a third predetermined pressure level is reached inside the aircraft structure and to maintain the pressure level inside the aircraft cabin structure at the third predetermined level for a third predetermined period of time. The third predetermined pressure level is higher than the second pressure level and preferably a pressure level which is higher than the pressure difference acting on the aircraft cabin structure during normal flight operation of the aircraft.

The first, the second and the third period of time may be predefined fixed time periods. The electronic control unit, however, might also be adapted to allow a manual change of the predetermined time periods during performing a leakage test on an aircraft cabin structure in response to specific test conditions, for example if an extended period of time is required to inspect the aircraft cabin structure during the aircraft cabin structure is held under an elevated pressure.

Preferably, pressurized air is supplied into the aircraft cabin structure at a rate of approximately 1.2 mbar/sec until a first predetermined elevated pressure level (differential pressure between the environmental pressure and the pressure inside the aircraft cabin) of approximately 100 mbar is reached. The pressure level of approximately 100 mbar might be maintained for a first predetermined period of time of approximately one minute. This time period usually is sufficient to recognize large leakages in the aircraft cabin structure. Thereafter, the pressure inside the aircraft cabin structure is increased at a rate of approximately 1.2 mbar/sec until a second predetermined pressure level inside the aircraft cabin structure of approximately 400 mbar is reached. This pressure levels is maintained for a second period of time of approximately eight minutes. This time period usually is sufficient to also recognize smaller leakages in the aircraft cabin structure.

Upon a further increase of the pressure inside the aircraft cabin structure, for safety reasons, operators are no longer allowed near the aircraft cabin structure to be tested. The electronic control unit of the inventive apparatus therefore preferably is a control unit which is adapted to allow a remote control of the entire test procedure. From the second predetermined pressure level of approximately 400 mbar the pressure inside the aircraft cabin structure is increased to a third predetermined pressure level of approximately 800 mbar, wherein the pressure is increased up to a level of approximately 593 mbar at a rate of approximately 1.2 mbar and from the level of approximately 593 mbar to the level of approximately 800 mbar at a rate of approximately 0.6 mbar. The pressure inside the aircraft cabin structure is maintained at the third predetermined pressure level of approximately 800 mbar for a third predetermined period of time of approximately 300 sec.

In a preferred embodiment of the inventive apparatus the electronic control unit further is adapted to control the air supply valve and the air discharge valve in dependence on signals provided by the pressure sensor so as to discharge air from the inside of the aircraft cabin structure until a fourth predetermined pressure level is reached, and to maintain the air supply valve and the air discharge valve in their closed states until a fifth predetermined pressure level is reached. Preferably, the pressure inside the aircraft cabin structure is decreased from the maximum pressure level of approximately 800 mbar to a fourth predetermined pressure level of approximately 593 mbar at a rate of approximately 1.2 mbar/sec. The fourth predetermined pressure level of approximately 593 mbar corresponds to the pressure difference acting on the aircraft cabin structure during normal flight operation of the aircraft. The fifth predetermined pressure level for example might be a level of approximately 500 mbar. Since the air supply valve and the discharge valve are maintained in their closed states, the pressure decrease from the fourth predetermined pressure level to the fifth predetermined pressure level is caused exclusively by leakages in the aircraft cabin structure.

The electronic control unit of the inventive apparatus preferably further is adapted to calculate a leakage value of the aircraft cabin structure in dependence on the decrease of the pressure inside the aircraft cabin structure from the fourth to the fifth predetermined level. For example, the calculated leakage value might correspond to a gradient of a tangent calculated for a time dependent pressure level curve between the fourth and the fifth predetermined pressure level at a predefined pressure level of for example approximately 556 mbar. The leakage value calculated by the electronic control unit might be compared to a nominal leakage value. If a difference between the measured leakage value and the nominal leakage value exceeds a predetermined limit, appropriate steps have to be taken to improve the leakage characteristics of the aircraft cabin structure.

After the pressure level inside the aircraft cabin structure has reached the fifth predetermined pressure level the electronic control unit might control the air supply valve and the air discharge valve in dependence on signals provided by the pressure sensor so as to discharge air from the inside of the aircraft cabin structure at a rate of approximately 1.2 mbar until the pressure inside the aircraft cabin structure again reaches the environmental pressure level.

The inventive apparatus for detecting leakages in an aircraft cabin structure further might comprise a warning signal output device which is adapted to output a visible and/or an acoustic warning signal upon receiving a respective warning signal output command from the electronic control unit. For example, the electronic control unit might be adapted to output a warning signal output command each time the pressure level inside the aircraft cabin structure reaches one of the predetermined pressure levels. Furthermore, the electronic control unit might be adapted to compare time dependent pressure levels measured by means of the pressure sensor during testing an aircraft cabin structure with corresponding time dependent nominal pressure levels. The electronic control unit then might provide a warning signal output command to the warning signal output device, if a difference between a measured pressure level inside the aircraft cabin structure and a corresponding nominal pressure level exceeds a predetermined limit. The electronic control unit might further be adapted to automatically interrupt the test, e.g. interrupt the supply of the pressurized air into the aircraft cabin structure, if a difference between a measured pressure level inside the aircraft cabin structure and a corresponding nominal pressure level exceeds a predetermined limit.

The inventive apparatus further might be provided with a manually operable emergency shut-off device which allows to interrupt a test, in particular interrupt a supply of pressurized air into the aircraft cabin structure at any time during the test.

The inventive apparatus for detecting leakages in an aircraft cabin structure further might comprise a ball valve disposed in the air supply line. For example, the ball valve might be disposed in the air supply line downstream of the air supply valve. The ball valve acts as a safety device which allows to reliably control the pressure inside the aircraft cabin structure even in case of a failure of the air supply valve.

A portion of the air supply line and/or the air supply valve and/or the pressure sensor and/or the air discharge valve and/or the ball valve might be mounted on a mobile carriage. The mobile carriage with several essential components of the inventive apparatus then can be displaced for example between different stations of a final assembly line.

The inventive apparatus for detecting leakages in an aircraft cabin structure might be used during final assembly of an aircraft to detect leakages in the assembled aircraft cabin structure. It is, however, also possible to use the inventive apparatus for example in a flight line to detect leakages in individual components of the aircraft cabin structure, for example the aircraft fuselage.

According to an alternative embodiment the inventive apparatus for pressurising an aircraft cabin structure and measuring the amount of leakage of the aircraft cabin structure comprises an air supply line which at a first end is connectable to a pressurized air source and which at a second end is connectable to the aircraft cabin structure so as to supply pressurized air from the pressurized air source into the aircraft cabin structure, an air supply valve disposed in the air supply line, a pressure sensor for sensing the pressure inside the aircraft cabin structure and for providing signals indicative of the pressure inside the aircraft cabin structure, an air discharge line which at a first end is connectable to the aircraft cabin structure and which at a second end is connectable to an air discharge opening so as to discharge air from the inside of the aircraft cabin structure to the air discharge opening, an air discharge valve disposed in the air discharge line, and at least one pressure schedule. An electronic control unit is adapted to control the air supply valve and the air discharge valve in dependence on signals provided by the pressure sensor and in dependence on a set-value from the pressure schedule so as to supply pressurized air into the aircraft cabin structure or to discharge air from the aircraft cabin structure so as to control the pressure inside the aircraft cabin structure according to the pressure schedule.

Preferably, a plurality of pressure schedules is provided for different aircraft types and different test scopes.

Preferably, the electronic control unit further is adapted to select, control and/or adapt a pressure schedule.

Furthermore, the electronic control unit might be adapted to provide a protocol of a measuring procedure which contains a value representing the cabin leakage.

An inventive method for detecting leakages in an aircraft cabin structure comprises the steps of supplying pressurized air from a pressurized air source into the aircraft cabin structure via an air supply line, sensing the pressure inside the aircraft cabin structure and providing signals indicative of the pressure inside the aircraft cabin structure by means of a pressure sensor, and discharging air from the inside of the aircraft cabin structure to an air discharge opening via an air discharge line. An air supply valve disposed in the air supply line and an air discharge valve disposed in the air discharge line are controlled by means of an electronic control unit in dependence on signals provided by the pressure sensor so as to supply pressurized air into the aircraft cabin structure until a first predetermined pressure level is reached inside the aircraft cabin structure, to maintain the pressure inside the aircraft cabin structure at the first predetermined level for a first predetermined period of time, and thereafter to discharge air from the inside of the aircraft cabin structure.

The inventive method might further comprise the step of controlling the air supply valve and the air discharge valve by means of the electronic control unit in dependence on signals provided by the pressure sensor so as to further supply pressurized air into the aircraft cabin structure after the first predetermined period of time and prior to discharging air from the inside of the aircraft cabin structure until a second predetermined pressure level is reached inside the aircraft cabin structure. The pressure inside the cabin structure might be maintained at the second predetermined level for a second predetermined period of time. After the second predetermined period of time further pressurized air might be supplied into the aircraft cabin structure until a third predetermined pressure level is reached inside the aircraft cabin structure. The pressure inside the aircraft cabin structure might be maintained at the third predetermined level for a third predetermined period of time.

Preferably, the inventive method also comprises the step of controlling the air supply valve and the air discharge valve by means of the electronic control unit in dependence on signals provided by the pressure sensor so as to discharge air from the inside of the aircraft cabin structure until a fourth predetermined pressure level is reached. The air supply valve and the air discharge valve may be maintained in their closed state until a fifth predetermined pressure level is reached. The decrease of the pressure inside the aircraft cabin structure from the fourth predetermined pressure level to the fifth predetermined pressure level is caused exclusively by leakages in the aircraft cabin structure.

The inventive method for detecting leakages in an aircraft cabin structure preferably further comprises the step of calculating a leakage value of the aircraft cabin structure in dependence on the decrease of the pressure inside the aircraft cabin structure from the fourth to the fifth predetermined level by means of the electronic control unit.

According to an alternative embodiment the inventive method for pressurising an aircraft cabin structure and measuring the amount of leakage of the aircraft cabin structure comprises the steps of supplying pressurized air from a pressurized air source into the aircraft cabin structure via an air supply line, sensing the pressure inside the aircraft cabin structure and providing signals indicative of the pressure inside the aircraft cabin structure by means of a pressure sensor, discharging air from the inside of the aircraft cabin structure to an air discharge opening via an air discharge line, and providing a pressure schedule. An air supply valve disposed in the air supply line and an air discharge valve disposed in the air discharge line are controlled by means of an electronic control unit in dependence on signals provided by the pressure sensor and in dependence on a set-value from the pressure schedule so as to supply pressurized air into the aircraft cabin structure or to discharge air from the aircraft cabin structure so as to control the pressure inside the aircraft cabin structure according to the pressure schedule.

Preferably, a plurality of pressure schedules is provided for different aircraft types and different test scopes.

The inventive method might further comprise the step of selecting, controlling and/or adapting a pressure schedule by means of the electronic control unit.

Preferably, the inventive method further comprises the step of providing a protocol of a measuring procedure which contains a value representing the cabin leakage by means of the electronic control unit.

Figure 2:
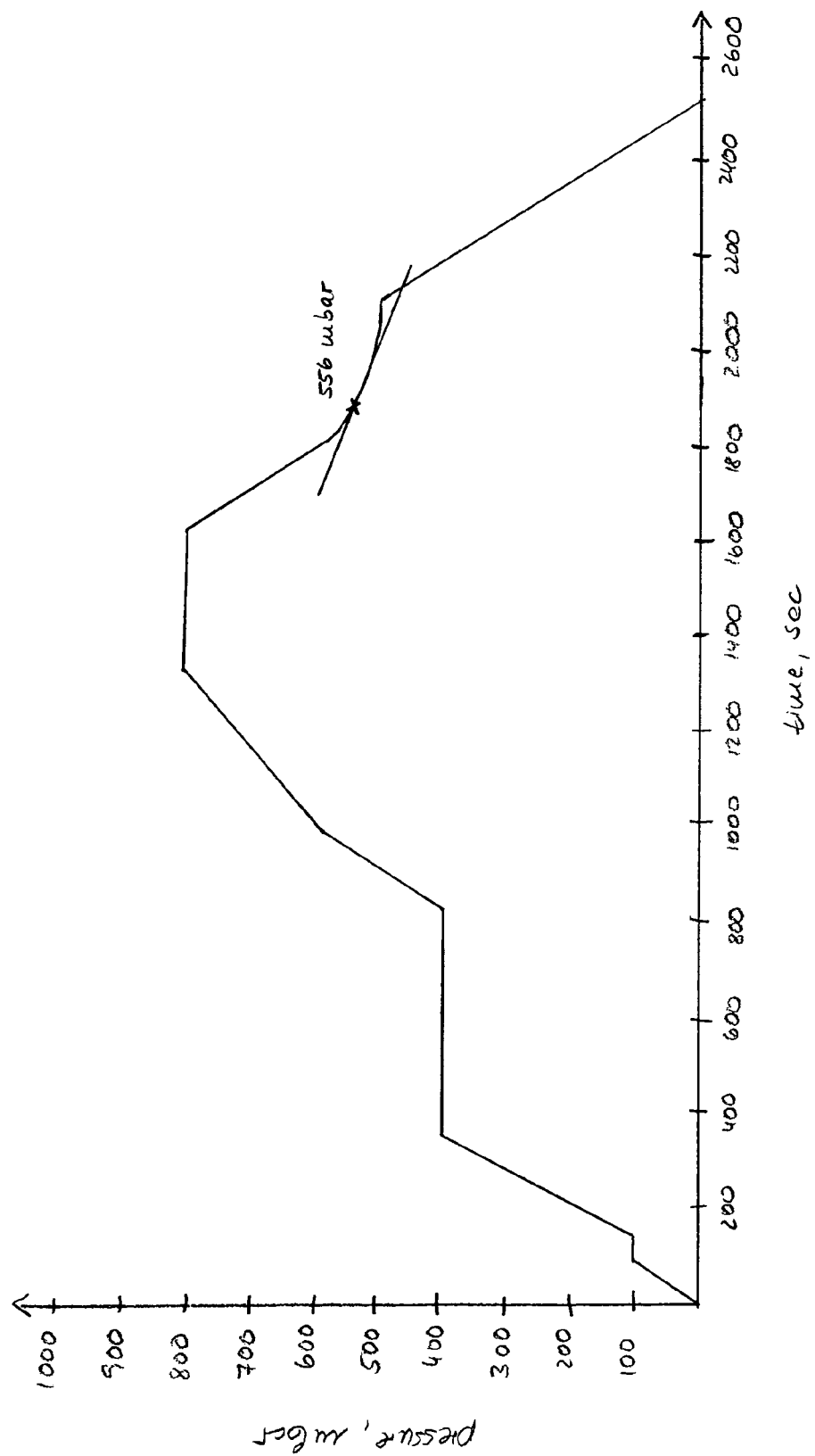

The present invention now is explained in detail with reference to the schematic drawings, in which FIG. 1 shows a preferred embodiment of an inventive apparatus for pressurising an aircraft cabin structure and measuring the amount of leakage of an aircraft cabin structure, and FIG. 2 shows a time dependent curve of the pressure inside the aircraft cabin structure during performing a test for pressurising an aircraft cabin structure and measuring the amount of leakage of an aircraft cabin structure.

In FIG. 1 an apparatus 10 for pressurising an aircraft cabin structure 12 and measuring the amount of leakage of the aircraft cabin structure 12 comprises an air supply line 14. A first end of the air supply line 14 is connected to a pressurized air source (not shown in FIG. 1) which supplies air at a pressure of 6 to 8 bar. A first manually operable isolation valve 16 is provided in the air supply line 14. Downstream of the first isolation valve 16 a second isolation valve 18 is disposed in the air supply line 14 which serves to automatically interrupt the supply of pressurized air through the air supply line 14 in the event of a power failure. A filter 20 disposed in the air supply line 14 downstream of the second isolation valve 18 serves to filter the pressurized air supplied into the aircraft cabin structure and thus avoids that particulate impurities are introduced into the aircraft cabin structure.

The air supply line 14 comprises a first fixed portion 14*a* which is connected to a second portion 14*b*, wherein the second portion 14*b* of the air supply line 14 is mounted on a mobile carriage 22. The second portion 14*b* of the air supply line 14 is connected to a third air supply line portion 14*c* which, like the first portion 14*a* is provided in the form of a fixed tubing. The air supply line 14 finally comprises a fourth portion 14*d* formed by a flexible tubing which connects the fixed fourth portion 14*c* of the air supply line 14 to an opening 24 provided in a dummy aircraft cabin door 26. During performing a test for detecting leakages in the aircraft cabin structure 12 the dummy cabin door 26 replaces the original cabin door.

As becomes apparent from the drawing in FIG. 1, the third fixed portion 14*c* of the air supply line 14 branches so as to extend to two different connecting points 28, 28'. The fourth flexible tubing portion 14*d* of the air supply line 14 thus can be connected to any of the connecting points 28, 28' of the third portion 14*c* of the air supply line 14. Selection valves 30, 30' are provided in the third portion 14*c* of the air supply line 14 so as to selectively supply pressurized air to a selected one of the connecting points 28, 28'. The apparatus 10 thus can be used to perform tests for detecting leakages in an aircraft cabin structure of differently sized aircraft.

The first, the second and the major part of the third portion 14*a*, 14*b*, 14*c* of the air supply line 14, the valve 16, 18, 30, 30', the filter 20 and the mobile carriage 22 are space-savingly disposed in a basement of an aircraft manufacturing plant. The third portion 14*c* of the air supply line 14 extends through an opening 32 provided in the basement ceiling 34.

An electromagnetic air supply valve 36 is disposed in the second portion 14*b* of the air supply line 14 and mounted on the mobile carriage 22. In its open state the air supply valve 36 allows pressurized air to be supplied from the pressurized air source to the aircraft cabin structure 12 and regulates the pressure of the pressurized air supplied to the aircraft cabin structure 12. A first pressure sensor 38 serves to measure the pressure within the air supply line 14 downstream of the air supply valve 36.

A ball valve 40 is disposed in the second portion 14*b* of the air supply line 14 downstream of the air supply valve 36. The ball valve 40 also is mounted on the mobile carriage 22. In its open state the ball valve 40 allows the supply of pressurized air from the pressurized air source to the aircraft cabin structure 12. To the contrary, in its closed state the ball valve 40 interrupts the supply of air from the pressurized air source to the aircraft cabin structure 12.

An air discharge line 42 branches off the second portion 14*b* of the air supply line 14 and extends to an air discharge opening 44 which opens to the environment. A sound absorber 46 is provided at the air discharge opening 44 so as to dampen noise generated upon discharging air from the inside of the aircraft cabin structure 12 through the air discharge opening 44. An electromagnetic air discharge valve 48 is disposed in the air discharge line 42. In its open state the air discharge valve 48 allows air to be discharged from the inside of the aircraft cabin structure 12 to the air discharge opening 44 and regulates the pressure of the air discharged from the aircraft cabin structure 12 to the air discharge opening 44.

A second pressure sensor 50 is also mounted on the mobile carriage 22. The second pressure sensor 50 is connected to the inside of the aircraft cabin structure 12 via a flexible tubing 52. The sensor 50 serves to measure the pressure inside the aircraft cabin structure 12 and to provide signals indicative of the pressure inside the aircraft cabin structure 12 to an electronic control unit ECU.

The electronic control unit ECU is disposed remote from the mobile carriage 22 and the aircraft cabin structure to be tested but is adapted to remote control the air supply valve 36, the ball valve 40 and the air discharge valve 48 in dependence on signals provided by the second pressure sensor 50. The electronic control unit ECU comprises a display unit so as to display test parameters, in particular a curve of the pressure inside the aircraft cabin structure 12 measured by means of the second pressure sensor 50 in dependence on the time as shown in FIG. 2 to an operator. The electronic control unit ECU thus also serves as a man-machine-interface. The electronic control unit ECU further is connected to a warning signal output device 54 which is adapted to output a visible and an acoustic warning signal upon receiving a respective warning signal output command from the electronic control unit ECU.

For performing a test for detecting leakages in the aircraft cabin structure 12 the first isolation valve 16 is manually opened. The second isolation valve 18 and a first selection valve 30' are also opened. Pressurized air then is supplied from the pressurized air source to the aircraft cabin structure 12, wherein the air supply valve 36 and the ball valve 40 are controlled by the electronic control unit ECU so as to ensure that the pressure inside the aircraft cabin structure 12 increases at a rate of 1.2 mbar/sec. During the supply of pressurized air to the aircraft cabin structure 12 the air discharge valve 48 is maintained in its closed state.

When the pressure inside the aircraft cabin structure 12 has reached a first predetermined level of 100 mbar (pressure difference between the environmental pressure and the pressure inside the aircraft cabin structure 12) the electronic control unit ECU provides a warning signal output command to the warning signal output device 54 so that the warning signal output device 54 outputs a visible and an acoustic warning signal. As becomes apparent from FIG. 2, the first predetermined pressure level of 100 mbar is maintained for a first predetermined period of time of approximately one minute by appropriately controlling the air supply valve 36, the ball valve 40 and the air discharge valve 48 by means of the electronic control unit ECU. During the first predetermined period of time the aircraft cabin structure 12 can be inspected, so that large leakages in the aircraft cabin structure 12 can easily be detected.

After the first predetermined period of time the pressure inside the aircraft cabin structure 12 is further increased at a rate of 1.2 mbar/sec until a second predetermined pressure level of 400 mbar is reached. Then, again, a warning signal output command is provided by the electronic control unit ECU to the warning signal output device 54 which then outputs a visible and an acoustic warning signal. By appropriately controlling the air supply valve 36, the ball valve 40 and the air discharge valve 48 the pressure inside the aircraft cabin structure 12 is maintained at the second predetermined level of 400 mbar for a second predetermined period of time of approximately eight minutes. During the second predetermined period of time the aircraft cabin structure 12 again can be inspected, so that also small leakages in the aircraft cabin structure 12 which were not recognized during the first predetermined period of time can be detected.

After the second predetermined period of time the pressure inside the aircraft cabin structure 12 again is increased by appropriately controlling the air supply valve 36, the ball valve 40 and the air discharge valve 48 by means of the electronic control unit until a pressure level of 593 mbar is reached. Thereafter, the pressure increase rate is reduced to 0.6 mbar/sec until the pressure inside the aircraft cabin structure 12 reaches a third predetermined level of 800 mbar. The third predetermined pressure level of 800 mbar is well above the pressure difference acting on the aircraft cabin structure 12 during normal flight operation of the aircraft which is approximately 593 mbar. When the pressure inside the aircraft cabin structure 12 reaches the third predetermined level of 800 mbar the electronic control unit ECU again provides a warning signal output command to the warning signal output device 54 which then outputs a visible and an acoustic warning signal. By appropriately controlling the air supply valve 36, the ball valve 40 and the air discharge valve 48 the pressure inside the aircraft cabin structure 12 is maintained at the third predetermined level for a third predetermined period of time of approximately 300 sec.

After the third predetermined period of time the air supply valve 36, the ball valve 40 and the air discharge valve 48 are controlled by means of the electronic control unit such that the pressure inside the aircraft cabin structure 12 decreases at a rate of 1.2 mbar/sec to a fourth predetermined pressure level of 593 mbar. As already mentioned above, the fourth predetermined pressure level of 593 mbar corresponds to the pressure difference acting on the aircraft cabin structure 12 during normal flight operation of the aircraft. When the pressure inside the aircraft cabin structure 12 has reached the fourth predetermined level of 593 mbar, the air supply valve 36, the ball valve 40 and the air discharge valve 48 are closed. This operational state of the valves 36, 40, 48 is maintained until the pressure inside the aircraft cabin structure 12 has decreased to a fifth predetermined level of 500 mbar. The pressure decrease from 593 mbar to 500 mbar is caused exclusively by leakages in the aircraft cabin structure 12.

When the pressure inside the aircraft cabin structure 12 has reached the fifth predetermined level of 500 mbar, the electronic control unit ECU controls the air supply valve 36, the ball valve 40 and the air discharge valve 48 such that the pressure inside the aircraft cabin structure 12 decreases from the fifth predetermined pressure level of 500 mbar to environmental pressure at a rate of 1.2 mbar/sec.

The electronic control unit ECU calculates a leakage value of the aircraft cabin structure 12 by calculating a gradient of a tangent against the time dependent pressure curve shown in FIG. 2 between the fourth and the fifth predetermined pressure level at a pressure level of 556 mbar. This calculated leakage value is compared to a nominal leakage value. If a difference between the calculated leakage value and the nominal leakage value does not exceed a predetermined limit, the leakage characteristics of the aircraft cabin structure 12 are found to be sufficient.

The invention claimed is:

1. Apparatus for pressurising an aircraft cabin structure and measuring the amount of leakage of the aircraft cabin structure, which comprises:
   an air supply line which at a first end is connectable to a pressurized air source and which at a second end is connectable to the aircraft cabin structure so as to supply pressurized air from the pressurized air source into the aircraft cabin structure,
   an air supply valve disposed in the air supply line,
   a pressure sensor for sensing the pressure inside the aircraft cabin structure and for providing signals indicative of the pressure inside the aircraft cabin structure,
   an air discharge line which at a first end is connectable to the aircraft cabin structure and which at a second end is connectable to an air discharge opening so as to discharge air from the inside of the aircraft cabin structure to the air discharge opening,
   an air discharge valve disposed in the air discharge line, and
   an electronic control unit which is adapted to control the air supply valve and the air discharge valve in dependence on signals provided by the pressure sensor so as to supply pressurized air into the aircraft cabin structure until a first predetermined pressure level is reached inside the aircraft cabin structure, to maintain the pressure inside the aircraft cabin structure at the first predetermined level for a first predetermined period of time, and thereafter to discharge air from the inside of the aircraft cabin structure.

2. Apparatus according to claim 1, wherein the electronic control unit further is adapted to control the air supply valve and the air discharge valve in dependence on signals provided by the pressure sensor so as to further supply pressurized air into the aircraft cabin structure after the first predetermined period of time and prior to discharging air from the inside of the aircraft cabin structure until a second predetermined pressure level is reached inside the aircraft cabin structure, to maintain the pressure inside the aircraft cabin structure at the second predetermined level for a second predetermined period of time, to further supply pressurized air into the aircraft cabin structure after the second predetermined period of time until a third predetermined pressure level is reached inside the aircraft cabin structure, and to maintain the pressure inside the aircraft cabin structure at the third predetermined level for a third predetermined period of time.

3. Apparatus according to claim 1, wherein the electronic control unit further is adapted to control the air supply valve and the air discharge valve in dependence on signals provided by the pressure sensor so as to discharge air from the inside of the aircraft cabin structure until a fourth predetermined pressure level is reached, and to maintain the air supply valve and the air discharge valve in their closed states until a fifth predetermined pressure level is reached.

4. Apparatus according to claim 3, wherein the electronic control unit further is adapted to calculate a leakage value of the aircraft cabin structure in dependence on the decrease of the pressure inside the aircraft cabin structure from the fourth to the fifth predetermined level.

5. Apparatus according to claim 1, further comprising a warning signal output device which is adapted to output a visible and/or an acoustic warning signal upon receiving a respective warning signal output command from the electronic control unit.

6. Apparatus according to claim 1, further comprising a ball valve disposed in the air supply line downstream of the air supply valve.

7. Apparatus according to claim 1, wherein a portion of the air supply line and/or the air supply valve and/or the pressure sensor and/or the air discharge valve and/or the ball valve are mounted on a mobile carriage.

8. Apparatus for pressurising an aircraft cabin structure and measuring the amount of leakage of the aircraft cabin structure which comprises:
   an air supply line which at a first end is connectable to a pressurized air source and which at a second end is connectable to the aircraft cabin structure so as to supply pressurized air from the pressurized air source into the aircraft cabin structure,
   an air supply valve disposed in the air supply line,
   a pressure sensor for sensing the pressure inside the aircraft cabin structure and for providing signals indicative of the pressure inside the aircraft cabin structure, an air discharge line which at a first end is connectable to the aircraft cabin structure and which at a second end is connectable to an air discharge opening so as to discharge air from the inside of the aircraft cabin structure to the air discharge opening, an air discharge valve disposed in the air discharge line, at least one pressure schedule, and an electronic control unit which is adapted to control the air supply valve and the air discharge valve in dependence on signals provided by the pressure sensor and in dependence on a set-value from the pressure schedule so as to supply pressurized air into the aircraft cabin structure or to discharge air from the aircraft cabin structure so as to control the pressure inside the aircraft cabin structure according to the pressure schedule.

9. Apparatus according to claim 8, wherein a plurality of pressure schedules is provided for different aircraft types and different test scopes.

10. Apparatus according to claim 8, wherein the electronic control unit further is adapted to select, control and/or adapt a pressure schedule.

11. Apparatus according to claim 8, wherein the electronic control unit further is adapted to provide a protocol of a measuring procedure which contains a value representing the cabin leakage.

12. Method for pressurising an aircraft cabin structure and measuring the amount of leakage of the aircraft cabin structure, which comprises the steps of:

supplying pressurized air from a pressurized air source into the aircraft cabin structure via an air supply line, sensing the pressure inside the aircraft cabin structure and providing signals indicative of the pressure inside the aircraft cabin structure by means of a pressure sensor, discharging air from the inside of the aircraft cabin structure to an air discharge opening via an air discharge line, controlling an air supply valve disposed in the air supply line and an air discharge valve disposed in the air discharge line by means of an electronic control unit in dependence on signals provided by the pressure sensor so as to supply pressurized air into the aircraft cabin structure until a first predetermined pressure level is reached inside the aircraft cabin structure, to maintain the pressure inside the aircraft cabin structure at the first predetermined level for a first predetermined period of time, and thereafter to discharge air from the inside of the aircraft cabin structure.

13. Method according to claim 12, further comprising the step of controlling the air supply valve and the air discharge valve by means of the electronic control unit in dependence on signals provided by the pressure sensor so as to further supply pressurized air into the aircraft cabin structure after the first predetermined period of time and prior to discharging air from the inside of the aircraft cabin structure until a second predetermined pressure level is reached inside the aircraft cabin structure, to maintain the pressure inside the aircraft cabin structure at the second predetermined level for a second predetermined period of time, to further supply pressurized air into the aircraft cabin structure after the second predetermined period of time until a third predetermined pressure level is reached inside the aircraft cabin structure, and to maintain the pressure inside the aircraft cabin structure at the third predetermined level for a third predetermined period of time.

14. Method according to claim 12, further comprising the step of controlling the air supply valve and the air discharge valve by means of the electronic control unit in dependence on signals provided by the pressure sensor so as to discharge air from the inside of the aircraft cabin structure until a fourth predetermined pressure level is reached, and to maintain the air supply valve and the air discharge valve in their closed states until a fifth predetermined pressure level is reached.

15. Method according to claim 14, further comprising the step of calculating a leakage value of the aircraft cabin structure in dependence on the decrease of the pressure inside the aircraft cabin structure from the fourth to the fifth predetermined level by means of the electronic control unit.

16. Method for pressurising an aircraft cabin structure and measuring the amount of leakage of the aircraft cabin structure, which comprises the steps of:

supplying pressurized air from a pressurized air source into the aircraft cabin structure via an air supply line, sensing the pressure inside the aircraft cabin structure and providing signals indicative of the pressure inside the aircraft cabin structure by means of a pressure sensor, discharging air from the inside of the aircraft cabin structure to an air discharge opening via an air discharge line, providing a pressure schedule, and controlling an air supply valve disposed in the air supply line and an air discharge valve disposed in the air discharge line by means of an electronic control unit in dependence on signals provided by the pressure sensor and in dependence on a set-value from the pressure schedule so as to supply pressurized air into the aircraft cabin structure or to discharge air from the aircraft cabin structure so as to control the pressure inside the aircraft cabin structure according to the pressure schedule.

17. Method according to claim 16, wherein a plurality of pressure schedules is provided for different aircraft types and different test scopes.

18. Method according to claim 16, further comprising the step of selecting, controlling and/or adapting a pressure schedule by means of the electronic control unit.

19. Method according to claim 16, further comprising the step of providing a protocol of a measuring procedure which contains a value representing the cabin leakage by means of the electronic control unit.

* * * * *